(12) United States Patent
Müller

(10) Patent No.: US 6,452,128 B1
(45) Date of Patent: Sep. 17, 2002

(54) METHOD OF FEEDING A WELDING MACHINE, AS WELL AS A WELDING MACHINE AND AN AUTOMATIC FEEDING DEVICE FOR CARRYING OUT THE METHOD

(75) Inventor: Eugen Müller, Dietikon (CH)

(73) Assignee: Elpatronic AG, Bergdietikon (CH)

( * ) Notice: Subject to any disclaimer, the term of this patent is extended or adjusted under 35 U.S.C. 154(b) by 119 days.

(21) Appl. No.: 09/650,469

(22) Filed: Aug. 29, 2000

(30) Foreign Application Priority Data

Sep. 3, 1999 (CH) .............................................. 1605/99
Oct. 4, 1999 (CH) .............................................. 1812/99

(51) Int. Cl.⁷ .............................................. B23K 11/06
(52) U.S. Cl. .............................. 219/83; 219/64; 219/81
(58) Field of Search .......................... 228/235.2, 235.3, 228/158, 17, 30, 49.1, 49.4; 219/64, 81, 83

(56) References Cited

U.S. PATENT DOCUMENTS

| 4,313,288 A | * | 2/1982 | Tassi et al. |
| 4,407,621 A | * | 10/1983 | Hansen |
| 4,887,343 A | * | 12/1989 | Ohishi |
| 4,912,292 A | * | 3/1990 | Hartz |
| 5,060,840 A | * | 10/1991 | Lentz et al. |
| 5,122,629 A | * | 6/1992 | Stieger |
| 5,131,581 A | * | 7/1992 | Geiermann |
| 5,726,410 A | * | 3/1998 | Fukushima et al. |
| 5,865,942 A | * | 2/1999 | Sinclair |
| 6,213,184 B1 | * | 4/2001 | Sinclair |

* cited by examiner

Primary Examiner—M. Alexandra Elve
Assistant Examiner—Kiley Stoner
(74) Attorney, Agent, or Firm—McCormick, Paulding & Huber LLP

(57) ABSTRACT

In a rolled seam welding machine which can be fed from the front for producing a lap seam, the welding roller which is disposed in front of the Z rail can be swung away in order to facilitate automatic feeding of the welding stock into the Z rail.

19 Claims, 2 Drawing Sheets

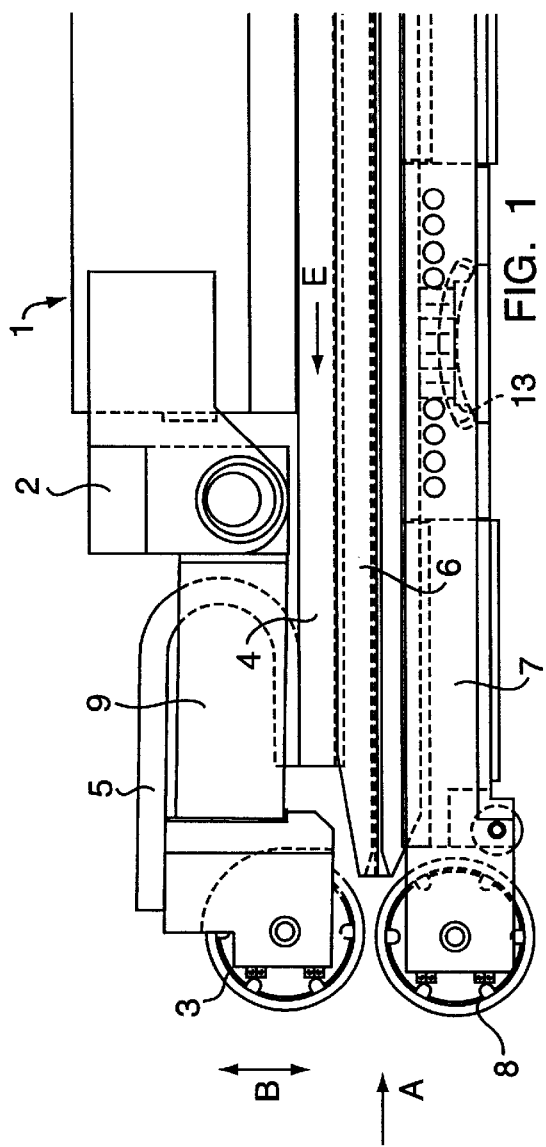
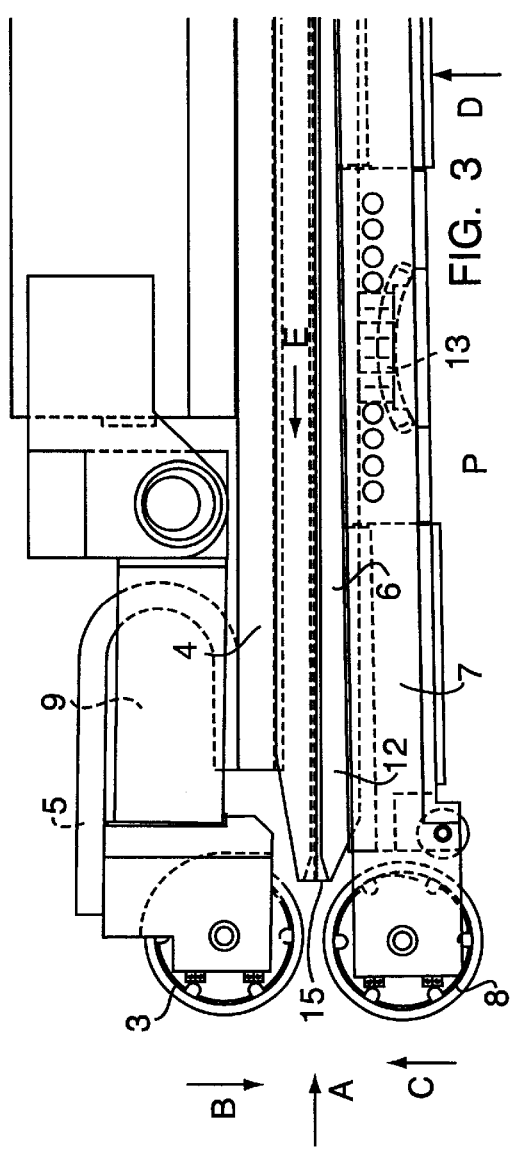
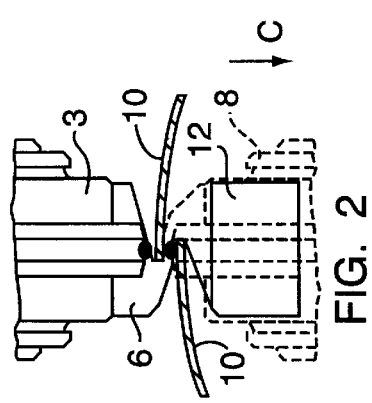
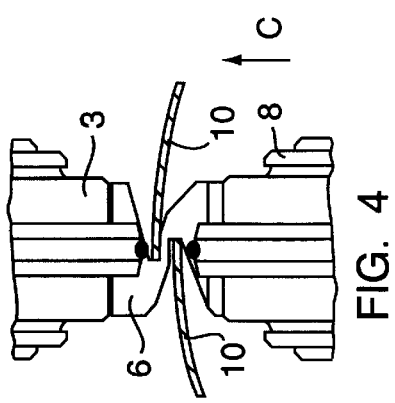

METHOD OF FEEDING A WELDING MACHINE, AS WELL AS A WELDING MACHINE AND AN AUTOMATIC FEEDING DEVICE FOR CARRYING OUT THE METHOD

BACKGROUND OF THE INVENTION

This invention relates to a method of feeding a welding machine for lap seam welding in which the welding stock is fed into a guide rail on the welding roller side and welding is effected thereafter in a direction opposite to the direction of feeding. The invention further relates to a rolled seam welding machine, having a guide rail for the edges of the welding stock to be welded with an overlap and two welding rollers, the first welding roller of which can be moved towards the second welding roller disposed in front of the inlet region of the guide rail in order to apply welding force. The invention also relates to an automatic feeding device for the welding machine and to an arrangement of two rolled seam welding machines.

Hand-fed welding machines (semi-automatic machines) are known for the rolled seam welding of the overlap of welding stock which is formed from a curved sheet metal section, e.g. sheet metal tubes with a "butterfly overlap" or container bodies. The actual welding electrode can be formed by a wire electrode which is continuously renewed and which travels on the electrode rollers. In these machines, feeding is effected from the welding roller side, which is adjoined in the direction of feeding by a guide rail which is termed a Z rail and into which the edges of the material which are to be welded have to be introduced. For this purpose, the operator opens the rolled welding stock and guides it past the welding rollers into the Z rail. Thereafter, clamping jaws are brought into engagement with the welding stock in the known manner, at the end of the welding stock which is remote from the welding rollers. Said clamping jaws are disposed on a carriage, and the welding stock is conveyed through the welding rollers, with its edges brought into overlap by the Z rail, in a direction opposite to the direction of feeding, wherein at the start of welding the upper welding roller is lowered from its inoperative position into the welding position. At the start of welding, the operator holds the welding stock firmly so that it is pressed into the channels of the Z rail. The seam is welded between the roller electrodes or wire electrodes and the welded material is received by the operator on the feeding side, after which renewed feeding with fresh welding stock is effected. The upper welding roller is spring-mounted in the known manner in order to apply the welding force (e.g. about 80 kg), and is thus able to sink slightly into the welding stock, which is squeezed during welding. Moreover, the upper welding roller can be folded away upwards from the fixed lower welding roller in order to maintain the machine and so as to be able to thread in the welding wire and to release any wire loops which are formed in operation by pulling on the wire.

One example of a known machine of this form of construction is tile semi-automatic ZSHa or CSTW rolled seam welding machine manufactured by SMAG Schweissmaschinen AG, Bergdietikon, Switzerland. Manual feeding is particularly suitable for piece parts or very small production runs. There is also a desire, however, for machines such as these to be fed automatically for larger numbers of pieces, For this reason, automatic feeding devices have been created which roll the welding stock laterally into the existing Z rail, so that feeding is effected behind the welding rollers. If the metal sheet which is rolled into the Z rail in this manner is grasped by the rear clamping jaws and is pushed towards the welding rollers, this results in an edge position in the Z rail which is not defined sufficiently accurately at the welding rollers, which is why these known automatic feeding devices comprise sizing tools, e.g. a roller collar or diabolo rollers, in the region of the welding rollers, in order to ensure satisfactory seam quality. Sizing tools such as these are expensive to manufacture and to adjust. Moreover, since a relative movement occurs therein between the welding stock and the tool, they give rise to problems with very sensitive welding stock, e.g. stainless steel drum bodies, since imprints of the tool can be formed on the welding stock.

The underlying object of the present invention is therefore generally to improve the feeding of a rolled seam welding machine of the type cited at the outset, and in particular is to facilitate simplified, inexpensive, automatic feeding which also makes it possible to weld sensitive welding stock.

SUMMARY OF THE INVENTION

The object of the invention is achieved for the method cited at the outset by means of moving the welding roller situated in front of the inlet of the guide rail for feeding so that the inlet can be fed directly from the front. The welding roller is moved back after feeding into its inoperative position situated in front of the guide rail. For the welding machine cited at the outset, this object is achieved by providing the machine with a second welding roller that can be moved so that the first welding roller exposes the inlet region in order to feed the welding stock into the guide rail.

Because the fixed lower welding roller according to the prior art is disposed so that it can be moved away from the inlet region of the guide machine, feeding can be effected in a much simpler manner from the front, and can be effected in particular without opening the rolled welding stock to a particularly wide extent and with linear introduction of the edges into the channels of the rail, which makes manual feeding, and particularly automatic feeding, considerably easier, because the latter can now also be effected from the front. After feeding, said welding roller is moved back into its normal position, and welding is performed in a conventional manner by moving the other welding roller into its welding position and moving the welding stock through the rollers. It is preferable if the automatic feeding device holds the welding stock until shortly before the start of the welding operation, so that the edge position of the welding stock is defined in the guide rail or Z rail. This enables the aforementioned tools to be dispensed with in a simple manner. As soon as the welding procedure has ensured defined conditions at the start of the weld seam or at the start of the overlapping edge, any further holding can be dispensed with, or it is sufficient to employ the holding technique which is already known, namely holding the material at its rear end by the known clamping jaws.

BRIEF DESCRIPTION OF THE DRAWINGS

Examples of embodiments are explained in more detail below with reference to the Figures, where:

FIG. 1 shows the welding arm of a welding machine for manual and automatic feeding, in its inoperative position;

FIG. 2 is an enlarged partial view of the arm shown in FIG. 1, from the front;

FIG. 3 shows the welding arm of FIG. 1 in the feeding position;

FIG. 4 is an enlarged partial view from the front of the welding arm shown in FIG. 3, in the feeding position.

DESCRIPTION OF THE PREFERRED EMBODIMENTS

Figure 5A:
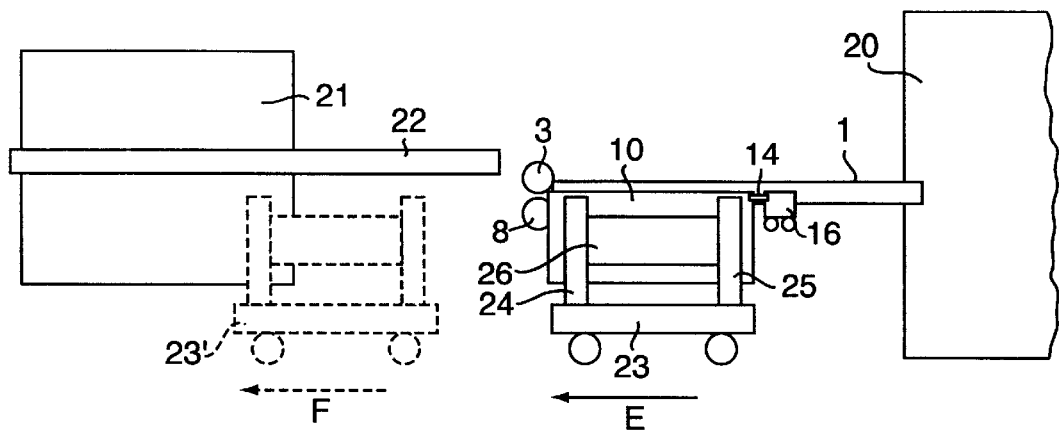
FIGS. 5a–5c are schematic illustrations of various steps during the feeding of a welding machine.

FIG. 1 shows the arm construction of a welding machine, which is otherwise not illustrated, since the construction thereof is known to one skilled in the art and does not need to be explained in detail here. In particular, the welding machine 20 (FIG. 5a) comprises a machine stand in which the arm 1 is held, and comprises means for generating the welding current and means for producing the various movements. The welding electrode can be formed from the welding wire which travels on the welding rollers in the known manner. As regards the construction of a known welding machine such as this, reference can be made, for example, to the welding machines manufactured by SMAG which were cited above. The arm which is denoted in general by 1 in FIG. 1 comprises an upper arm 2, a Z rail 6 and a lower arm 7, which in the example shown form one unit, which is advantageous for the stability of the arm 1. The other welding roller 3 in the Figure is disposed on the upper arm 2 in the known manner, namely on a swivelling extension arm 9. The swivelling arm 9 can be swung up and down in the direction of the arrow B, wherein the upper swivelling position shown in the Figure constitutes an inoperative position in which manual feeding of the welding machine can be carried out in the known manner. The extension arm 9 with the welding roller 3 is swivelled downwards into the welding position from the inoperative position in order to apply the welding force; this is known and is not explained in detail here. The upper welding roller 3 is supplied with welding current in the known manner via busbars 4 and 5. The Z rail 6 is disposed under busbar 4, and in the known manner comprises lateral channels in which the edges of the welding stock are inserted in order to be brought into the desired position of overlap by the Z rail 6. The lower arm 7, which bears the lower welding roller 8 as shown in the Figure, is disposed below the Z rail. The feeder devices which are known in the art for the welding wire which travels on the welding rollers 3 and 8 are not illustrated in the Figure. However, the welding machine could also be a machine without a welding wire. According to the prior art, the aforementioned elements comprising the upper arm 2, the busbar 4, the Z rail 6 and the lower arm 7 are fixedly screwed to each other. A machine such as this is fed from the front in the direction of arrow A. For this purpose, the operator manually opens the overlapping edges of the welding stock, which is a sheet metal section which is rolled to form a tube or is a sheet metal section which is rolled to form a container body, guides these edges around the lower welding roller into the Z rail in the direction of arrow A, and pushes the welding stock to the rear in the direction of arrow A until the rear end of the welding stock has also passed through the welding rollers and the welding stock is situated in its entirety in the Z rail. It can be seen from FIG. 2 that the lower welding roller 8, which is illustrated there merely by the broken lines, prevents the welding stock from being inserted directly into the Z rail 6, so that the operator has to perform the aforementioned opening movement, since for reasons of welding technology the upper face of the roller 8 (which bears the welding wire which is illustrated as the black ellipse in FIG. 2) is situated slightly above the lower channel of said rail. When the welding stock is situated entirely in the Z rail, its front end, which is further from the welding rollers 3, 8, is grasped in the known manner by clamping jaws 14 (FIG. 5a). The upper roller head 3 is then lowered in the known manner into the welding position and thereafter the welding stock is conveyed through the welding rollers in the direction of arrow E, namely in a direction opposite to the direction of feeding A, whereby welding of the seam is effected.

According to the invention, the lower welding roller 8 as shown in the Figure, which according to the prior art is situated in front of the Z rail, can be moved away from the inlet 15 thereof. This is illustrated in FIG. 3, which shows the inoperative position or feeding position of a welding machine according to the invention. In the example shown, the lower welding arm 7 can be swivelled downwards or can be swivelled upwards again into the position shown in FIG. 1, in the direction of arrow C. In the lower swivelling position shown in FIG. 3, the welding roller 8 exposes the inlet 15 of the Z rail 6, as is illustrated in FIG. 4, which shows the position of FIG. 3 as a view from the front. In this position of the welding roller 8, a simple feeding technique can be effected from the front, since it is no longer necessary specially to open the welding stock in order to avoid the welding roller 8. The welding stock can therefore be introduced linearly into the Z rail 6, which makes the feeding of the machine by an automatic feeding device considerably easier. The latter may consist, for example, of a robot or of a special loading carriage which receives pieces of welding stock from a rolling device and which thereafter introduces them into the Z rail 6. For this purpose, the Z rail 6 can be provided with an inlet region 15 which is made particularly large, and which makes automatic introduction easier. After feeding has been effected, the lower arm 7 is swung upwards again, so that it is situated in the fixed position according to the prior art which is shown in FIG. 1. The aforementioned clamping elements or clamping jaws are then actuated, the upper roller head 3 is lowered into the welding position, and the actual welding operation is performed by transporting the welding stock in the direction of arrow E.

The welding roller 8, which is situated in front of the Z rail 6, can be moved downwards in very different ways. A parallel downward displacement of the lower arm 7 or of the welding roller 8 only can be effected, or a rotation of the welding roller about the longitudinal axis of the arm 7 could be effected, which would also result in the movement away of that part of the roller which obstructs the inlet from the front. In the example shown, a swivelling movement is executed by means of a gate 13. A gate is disposed here in the Z rail 6. The gate counterpart is disposed in the lower arm 7, which enables the lower arm to swivel about the rigid Z rail. Moreover, lateral guidance of the lower arm 7 is ensured by the side flanks 12 of the Z rail 6, so that in addition a stable unit is formed. Instead of a gate 13 which displaces the swivelling axis of the lower arm 7 approximately into position P, an axis of rotation can also of course be provided directly in the lower arm and in the Z rail. The swivelling movement of the lower arm 7 can be effected by an actuating means which is situated at the rear end of the lower arm, which is not illustrated, e.g. a pneumatic or hydraulic actuating means. This pushes the rear end of the lower arm upwards in the direction of arrow D in order to cause the welding roller 8 to swing downwards, and pushes the end downwards in order to cause the welding roller 8 to swing up into its normal position or welding position.

The position which is illustrated can also of course be rotated by 180°, so that the arm which is shown in the Figure as the lower arm 7 is situated above and the arm shown in the Figure as the upper arm 2 is situated below. This may be desirable, for example, if two welding machines of this type are disposed in tandem, so that welding stock which consists of two half shells is first loaded into one welding machine and is welded there, and after its ejection from the latter in the direction of ejection is fed directly into a second welding machine which is situated on the same axis but is offset in height, in order to weld the second weld seam there. The welding stock can be any rolled or curved welding stock on which a lap seam is to be welded.

The semi-automatic welding machine described above is fed via a feeding device (automation). This comprises a rolling apparatus which is supplied with metal sheets from a stack of metal sheets, and a running rail into which the metal sheet is rolled so that its longitudinal edges are caught therein. The Z rail and the running rail grasp the body blank in the same manner. If the rolling apparatus and the running rail are specially disposed and formed so that feeding is effected from the discharge side of the welding arm, they can be coupled with the welding machine according to the invention to form an automatically operating welding installation 1. The feeder drive is then coupled to the drive for swivelling the lower arm, so that feeding is effected when and only when the lower arm is in the corresponding feeding position, i.e. in its lower swivelling position. In order to transfer the body blank, the running rail of the feeding machine is brought on to a common longitudinal axis with the Z rail of the welding machine so that the vessel or body blank can be displaced along the running rail into the Z rail. During welding, the running rail is then displaced again so that the body blank can pass through the welding rollers without entering the running rail again. After the welding process is complete, the body blank is conveyed further and the running rail is brought into line with the Z rail again for the insertion of the next body blank.

A robot can also take over the task of feeding. The robot then advantageously grasps the body blank at the face thereof with a double gripper device so that the body blank edge is grasped on its face near the longitudinal edge of the body blank to be welded, near one of the longitudinal edges each time, so that it is clamped and therefore cannot slip, and is inserted in the welding machine. This clamping movement, and thus the fixing of the face of the longitudinal edges of the body blank, is not initiated until after the first weld point has been produced, so that the edge position remains defined until the completion of welding.

The aforementioned, preferred feeding device and the method will now be explained more precisely with reference to FIGS. 5a–c.

These Figures show the welding machine 20 with the basic machine body and the arm 1 which is disposed thereon. In these Figures, a distinction is no longer made between the upper arm, Z rail and lower arm, in order to keep the drawings which are illustrated in the Figures simple. A feeding device is denoted in general as a block by reference numeral 21, and as already mentioned comprises a rolling station for metal sheets which are taken from a stack by means of a destacker device, for example, and which are introduced into the rolling station. Rolling is effected by introducing the sheet metal edges of the rolled metal sheet into channels in the running rail 22, which is fashioned in the same manner as a Z rail. In addition, the feeding device comprises a travelling carriage 23 and holding devices 24, 25 and 26 for the rolled welding stock.

FIG. 5a shows a position in which the rolled welding stock 10 has been brought into the welding machine by the travelling carriage 23, which travels on rails which are not illustrated, for example. The welding stock is held by the holding devices 24, 25 and 26 of the carriage 23 so that the edges of the welding stock, e.g. of a rolled container body, are pressed into the channels of the Z rail of the arm 1. Starting from this position, which is shown in FIG. 5a, welding commences by means of the welding rollers 3 and 8, as is known in principle. At the start of welding, the carriage 23 travels in the direction of arrow E whilst the welding stock 10 continues to be secured and is positioned in the channels of the Z rail. At the same time, the aforementioned rear clamping jaws 14 of the welding machine, which are conveyed on a carriage 16 for example, hold the rear end of the welding stock 10. After the start of the weld seam has been welded by the welding rollers, the carriage 23 is able to release the welding stock 10 from its holding device, for which purpose the carriage is designed so that it can open appropriately in order to release the welding stock The latter is then driven through the welding rollers in the known manner and in any event is still driven by the carriage 16 with the clamping jaws 14 and is moved in the direction of arrow E in order to weld the seam. A tool is not necessary here, since the start of the weld seam is still produced in the correct manner due to the holding device of the carriage 23, and the position of the edges of the welding stock in the Z rail is then predetermined thereby from the front and is predetermined from the back by the clamping jaws 14. After releasing the welding stock, the carriage 23 travels in the direction of arrow F to the feeding station, and it does this at a speed which is higher than the speed of welding, so as to be able to receive fresh welding stock during the welding operation. The carriage which is travelling back into the feeding position is shown by the dashed lines in FIG. 5a as carriage 23'.

Figure 5B:
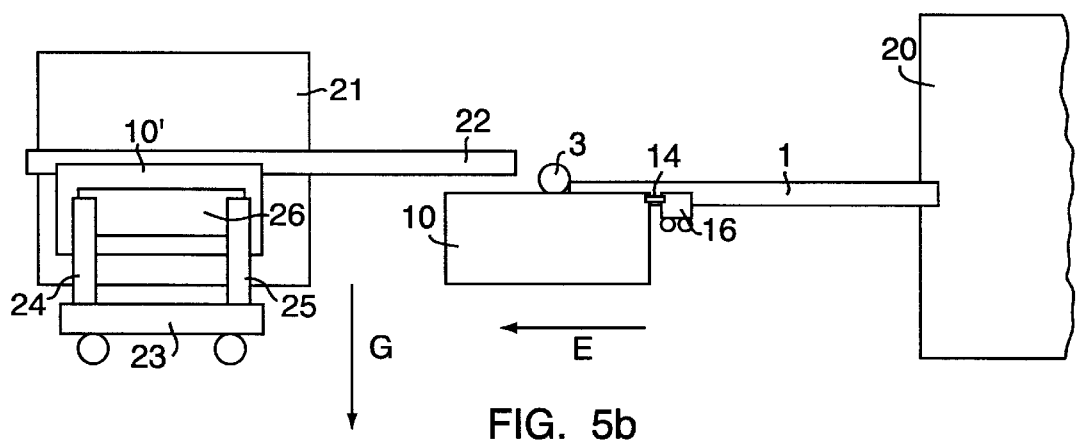

FIG. 5b shows how the carriage 23 has been loaded with fresh welding stock 10' in the feeding device 21. The welding stock is rolled by the rolling station so that its edges enter the channels in the running rail 22. This is effected with the holding elements 24–25 of the carriage 23 open. After rolling, said holding elements close again in order to assume the holding position and therefore hold the welding stock 10' securely in the channels of the running rail 22 which is constructed in the form of a Z rail. In the meantime, the welding stock 10 has been welded by the welding machine and is removed from the welding machine in the direction of arrow G by a means of conveying.

Figure 5C:
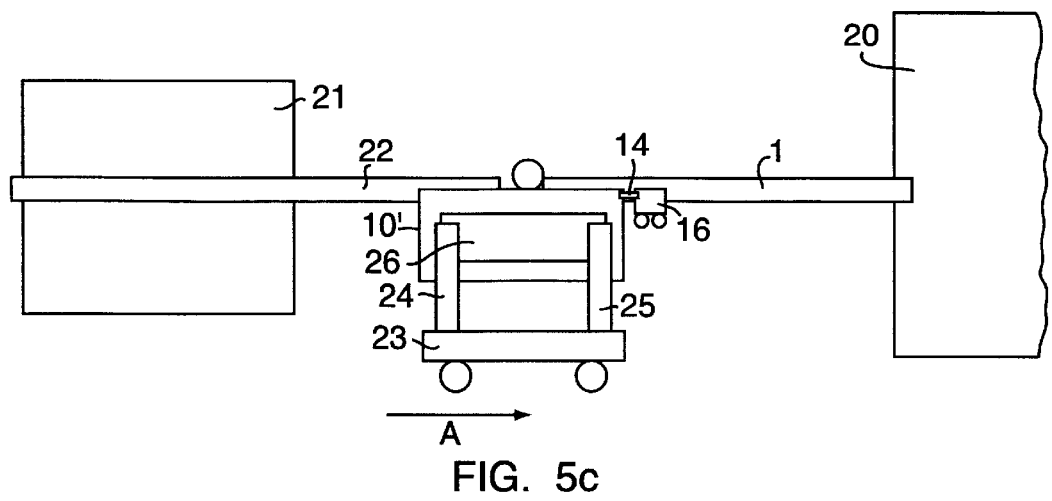

FIG. 5c shows the renewed feeding of the welding machine with fresh welding stock 10'. For this operation, the running rail 22 is lowered, for which purpose pneumatic, hydraulic or electric motor means can be provided, so that the front end of the running rail 22 is aligned with the front end of the Z rail of the arm 1. The carriage 23 is then moved in the direction of arrow A, whereby the welding stock 10' is introduced into the Z rail of the welding arm 1. The end of the welding stock 10' which is at the front in the direction of feeding or at the rear in the direction of welding is again received by and held by the clamping jaws 14 in the welding machine, and carriage 15 moves synchronously with carriage 23 in the direction of arrow A. At the end of the movement in the direction of arrow A, the position shown in FIG. 5a is again assumed, so that welding can start again with the welding stock being held in the carriage 23, followed by the release of the welding stock 10' by the carriage and the movement thereof in the direction of arrow F again, which can result in renewed loading with fresh welding stock. In the course of this procedure, the running rail 22 is has again been moved upwards into the position shown in FIG. 5a, so that the welded material 10' can emerge freely from the welding machine and does not enter the running rail 22 again.

What is claimed is:

1. A method of feeding a rolled seam welding machine for welding a lap seam, wherein feeding (A) of a welding stock (10) is effected into a guide rail (6) on a welding roller side and welding is effected thereafter in a direction opposite to the direction of feeding, characterised in that the welding roller (8) situated in front of an inlet (15) of the guide rail (6) is moved away for feeding so that the inlet (15) of the guide rail (6) can be fed directly from the front, and said welding roller is moved back after feeding into its inoperative position situated in front of the guide rail.

2. A method according to claim 1, characterised in that the welding roller (8) is moved away and moved back by a swivelling movement.

3. A method according to claim 2, characterised in that the swivel point (P) of the swivelling movement is situated below a lower arm (7) of the welding machine.

4. A method according to claim 1, characterised in that feeding is effected from the front by means of an automatic feeding device which in particular forms a holding device for the welding stock at the start of the welding operation.

5. A method according to claim 4, characterised in that the automatic feeding device comprises a running rail which is disposed in alignment with the guide rail of the welding machine for feeding and which after feeding is moved away from the guide rail of the welding machine in order to enable the welding stock to emerge from the welding machine.

6. A method according to claim 5, characterised in that the automatic feeding device comprises a carriage which holds the welding stock, which carriage cooperates with the running rail of the feeding device, which in a loading position receives and holds the welding stock, thereafter introduces the welding stock into the welding machine, secures it during the start of welding, and after the start of welding releases the welding stock and returns to the loading position.

7. A method according to claim 6, characterised in that in the loading position the welding stock is rolled and the edges thereof are introduced into the running rail.

8. A method according to claim 4, characterised in that the automatic feeding device introduces the welding stock into the guide rail and forms a holding device for the welding stock at the start of welding, which holding device pushes the edges of the welding stock into channels of the guide rail.

9. A method according to claim 8, characterised in that the automatic feeding device is formed by a robot which comprises holding elements for holding the rolled welding stock.

10. A rolled seam welding machine having a guide rail (6) for edges of a welding stock (10) which is to be welded with an overlap and having two welding rollers (3, 8), the first welding roller (3) of which can be moved towards the second welding roller (8), which is disposed in front of an inlet region (15) of the guide rail, in order to apply a welding force, characterised in that in order to feed the welding stock (10) into the guide rail the second welding roller (8) can be moved so that said welding roller (8) exposes the inlet region (15).

11. A rolled seam welding machine according to claim 10, characterised in that the second welding roller (8) can be swivelled away about a swivelling axis (P).

12. A rolled seam welding machine according to claim 11, characterised in that swivelling is effected by means of a gate guide (13).

13. An arrangement of two rolled seam welding machines according to claim 10, characterised in that feeding axes thereof are disposed so that the welding stock discharged from one machine can be introduced directly into the guide rail of the other machine by a loading device.

14. An automatic feeding device for a rolled seam welding machine according to claim 10, characterised in that it is constructed for feeding the welding machine from an ejection side of a welding arm, in a direction opposite to the direction of welding or the direction of ejection.

15. An automatic feeding device according to claim 14, characterised in that it is constructed as a robot comprising a holding element for holding the face of the welding stock.

16. An automatic feeding device according to claim 14, characterised in that it comprises a running rail which can be intermittently positioned in alignment with the guide rail of the welding machine and via which the welding stock can be introduced into the welding machine so that it is held by a driven carriage.

17. An automatic feeding device according to claim 16, characterised in that it is designed for holding the welding stock in the guide rail of the welding machine at the start of the welding operation.

18. An automatic feeding device according to claim 16, characterised in that the running rail of the feeding device is disposed for receiving the edges of rolled welding stock which emerges from a rolling station.

19. An installation comprising a rolled seam welding machine and an automatic feeding station according to claim 14.

* * * * *